US008285627B2

(12) United States Patent
Noel

(10) Patent No.: US 8,285,627 B2
(45) Date of Patent: Oct. 9, 2012

(54) PLATFORM FOR CUSTOMIZING A DERIVATIVE PORTFOLIO TRADING STRATEGY

(75) Inventor: Michael Anthony Noel, Dallas, TX (US)

(73) Assignee: Michael Anthony Noel, Dallas, TX (US)

( * ) Notice: Subject to any disclaimer, the term of this patent is extended or adjusted under 35 U.S.C. 154(b) by 1227 days.

(21) Appl. No.: 11/676,552

(22) Filed: Feb. 20, 2007

(65) Prior Publication Data

US 2007/0208651 A1  Sep. 6, 2007

Related U.S. Application Data

(60) Provisional application No. 60/775,751, filed on Feb. 22, 2006.

(51) Int. Cl.
G06Q 40/00 (2012.01)
(52) U.S. Cl. .......................................... 705/37; 705/36 R
(58) Field of Classification Search ............... 705/35–37
See application file for complete search history.

(56) References Cited

U.S. PATENT DOCUMENTS

| | | | | |
|---|---|---|---|---|
| 6,064,985 | A * | 5/2000 | Anderson | 705/36 R |
| 6,338,047 | B1 * | 1/2002 | Wallman | 705/36 R |
| 7,472,084 | B2 * | 12/2008 | Damschroder | 705/35 |
| 7,542,932 | B2 * | 6/2009 | Chalermkraivuth et al. | 705/35 |
| 7,783,547 | B1 * | 8/2010 | Gorer | 705/36 R |
| 7,831,494 | B2 * | 11/2010 | Sloan et al. | 705/36 R |
| 7,882,005 | B2 * | 2/2011 | Ricketts et al. | 705/36 R |
| 8,126,795 | B2 * | 2/2012 | Bollapragada et al. | 705/36 R |
| 8,219,477 | B2 * | 7/2012 | Subbu et al. | 705/36 R |
| 2002/0147671 | A1 * | 10/2002 | Sloan et al. | 705/36 |
| 2003/0088492 | A1 * | 5/2003 | Damschroder | 705/36 |
| 2004/0054614 | A1 * | 3/2004 | Tell et al. | 705/37 |
| 2004/0267651 | A1 * | 12/2004 | Jenson et al. | 705/36 |
| 2005/0137963 | A1 * | 6/2005 | Ricketts et al. | 705/37 |
| 2005/0187854 | A1 * | 8/2005 | Cutler et al. | 705/37 |
| 2005/0216390 | A1 * | 9/2005 | Snider et al. | 705/37 |
| 2005/0246240 | A1 * | 11/2005 | Padilla | 705/26 |

OTHER PUBLICATIONS

"Portfolio Manager Conference Call for ING Global Equity Dividend and Premium Opportunity Fund" PR Newswire. New York: Nov 22, 2005. p. 1.*
"Asset allocation spreads out the risk; Portfolio Doctors Columnists David Cruise and Alison Griffiths discuss a strategy for investing success Portfolio Doctors"; David Cruise and Alison Griffiths. Toronto Star. Toronto, Ont.: May 8, 2005. p. A.23.*
"The Ethical Funds Company(TM) Announces Portfolio Manager Change"; Canada NewsWire. Ottawa: Apr. 13, 2005. p. 1.*

* cited by examiner

Primary Examiner — Hani M Kazimi

(57) ABSTRACT

The inventor discovered a method for exploiting asymmetrical market return patterns that involves the steps of identifying seasons during which equities have historically done poorly, entering a short sell position on a portfolio of call options at or near the beginning of that season, and closing out the short sell position at or before the end of the season. The inventor has also developed an options trading strategy platform to help potential subscribers or clients to implement this options trading strategy.

9 Claims, 15 Drawing Sheets

| Stocks | Stock price (05/01/04) | Strike price (01/06 call option) | Option price (05/01/04) | Target amt per position | Target # contracts | Actual # contracts | Commission | Actual amt per position (05/01/04) | Stock price (12/29/04) | Option price (12/29/04) | Amt per position (12/29/04) | Profit per position |
|---|---|---|---|---|---|---|---|---|---|---|---|---|
| AMZN | $ 47.00 | 90 | $ 1.15 | $ 5,882.35 | 51.15 | 51 | $ 110.00 | $ 5,865.00 | $ 45.41 | $ 0.35 | $ 1,785.00 | $ 3,860.00 |
| ADI | $ 47.54 | 70 | $ 3.00 | $ 5,882.35 | 19.61 | 20 | $ 48.00 | $ 6,000.00 | $ 39.76 | $ 0.20 | $ 400.00 | $ 5,504.00 |
| GM | $ 45.43 | 70 | $ 0.75 | $ 5,882.35 | 78.43 | 78 | $ 164.00 | $ 5,850.00 | $ 40.20 | $ 0.10 | $ 780.00 | $ 4,742.00 |
| MRK | $ 47.11 | 70 | $ 1.25 | $ 5,882.35 | 47.06 | 47 | $ 102.00 | $ 5,875.00 | $ 32.32 | $ 0.05 | $ 235.00 | $ 5,436.00 |
| WM | $ 39.09 | 60 | $ 0.55 | $ 5,882.35 | 106.95 | 107 | $ 222.00 | $ 5,885.00 | $ 42.38 | $ 0.10 | $ 1,070.00 | $ 4,371.00 |
| DCX | $ 40.22 | 60 | $ 0.75 | $ 5,882.35 | 78.43 | 78 | $ 164.00 | $ 5,850.00 | $ 48.05 | $ 0.65 | $ 5,070.00 | $ 452.00 |
| NEM | $ 42.87 | 80 | $ 1.15 | $ 5,882.35 | 51.15 | 51 | $ 110.00 | $ 5,865.00 | $ 44.26 | $ 0.45 | $ 2,295.00 | $ 3,350.00 |
| KSS | $ 44.12 | 70 | $ 2.00 | $ 5,882.35 | 29.41 | 29 | $ 66.00 | $ 5,800.00 | $ 48.18 | $ 0.95 | $ 2,755.00 | $ 2,913.00 |
| MXIM | $ 47.35 | 80 | $ 1.90 | $ 5,882.35 | 30.96 | 31 | $ 70.00 | $ 5,890.00 | $ 42.03 | $ 0.15 | $ 465.00 | $ 5,285.00 |
| BRCM | $ 40.56 | 60 | $ 5.50 | $ 5,882.35 | 10.70 | 11 | $ 30.00 | $ 6,050.00 | $ 32.38 | $ 0.65 | $ 715.00 | $ 5,275.00 |
| GENZ | $ 46.25 | 85 | $ 1.10 | $ 5,882.35 | 53.48 | 53 | $ 114.00 | $ 5,830.00 | $ 58.51 | $ 0.80 | $ 4,240.00 | $ 1,362.00 |
| MERQ | $ 45.76 | 80 | $ 2.40 | $ 5,882.35 | 24.51 | 25 | $ 58.00 | $ 6,000.00 | $ 45.57 | $ 0.45 | $ 1,125.00 | $ 4,759.00 |
| SEPR | $ 47.95 | 70 | $ 5.30 | $ 5,882.35 | 11.10 | 11 | $ 30.00 | $ 5,830.00 | $ 59.60 | $ 5.70 | $ 6,270.00 | $ (500.00) |
| SPW | $ 47.32 | 80 | $ 1.15 | $ 5,882.35 | 51.15 | 51 | $ 110.00 | $ 5,865.00 | $ 39.37 | $ 0.10 | $ 510.00 | $ 5,135.00 |
| IRF | $ 46.00 | 70 | $ 3.90 | $ 5,882.35 | 15.08 | 15 | $ 38.00 | $ 5,850.00 | $ 44.36 | $ 1.40 | $ 2,100.00 | $ 3,674.00 |
| ADBE | $ 40.85 | 65 | $ 1.70 | $ 5,882.35 | 34.60 | 35 | $ 78.00 | $ 5,950.00 | $ 63.48 | $ 7.80 | $ 27,300.00 | $ (21,506.00) |
| S | $ 41.69 | 60 | $ 2.10 | $ 5,882.35 | 28.01 | 28 | $ 64.00 | $ 5,880.00 | $ 51.62 | $ 1.70 | $ 4,760.00 | $ 992.00 |
| Total: | | | | $ 100,000.00 | | | $ 1,578.00 | $ 100,135.00 | | | $ 61,875.00 | $ 35,104.00 |

PORTFOLIO: Option Portfolio 1

| Ticker Symbol | Public Company |
|---|---|
| CSCO | Cisco Systems, Inc. |
| AAPL | Apple Computer Inc. |
| BA | The Boeing Company |
| XOM | Exxon Mobil Corp. |
| GG | Goldcorp Inc. |
| MSFT | Microsoft Corp. |
| C | Citigroup Inc. |
| GS | Goldman Sachs Group Inc. |
| BBY | Best Buy Co. Inc. |
| ORCL | Oracle Corp. |

Cisco Systems Inc. ( NGS : CSCO )

| | | | |
|---|---|---|---|
| Last Trade: | 26.63 | Day's Range: | 26.38 - 27.15 |
| Trade Time: | 10:36:31 | 52wk Range: | 17.10 - 28.99 |
| Change: | -0.35 | Volume: | 23,612,273 |
| Prev Close: | 26.98 | Market Cap: | 161,716,496,308 |
| Open: | 27.13 | P/E(ttm): | 28.40 |
| Bid: | 26.62 | EPS(ttm): | 0.95 |
| Ask: | 26.63 | Div&Yield: | N/A |
| 21 day avg: | 28.09 | 50 day avg: | 27.53 |
| 200 day avg: | 23.43 | Exchange | NGS |

Sector Breakdown

- Industrial Goods (18%)
- Basic Materials (18%)
- Financial (18%)
- Services (9%)
- Technology (36%)

Tabs: Portfolio Selection | Stock Selection | Option Selection | Investment Calculation | Portfolio Value Back | Next

| Portfolio Selection | Stock Selection | Option Selection | Investment Calculation | Portfolio Value |

PORTFOLIO: Option Portfolio 1

| Ticker Symbol | Public Company | Stock Price | | Ticker Symbol | Public Company | Stock Price |
|---|---|---|---|---|---|---|
| CSCO | Cisco Systems, Inc. | 26.62 | | AAPL | Apple Computer Inc. | 90.29 |
| BA | The Boeing Company | 88.20 | | XOM | Exxon Mobile Corp. | 71.93 |
| GG | Goldcorp Inc. | 26.08 | | CAT | Catepillar Inc. | 59.66 |
| MSFT | Microsoft Corp. | 31.01 | | C | Citigroup Inc. | 54.37 |
| GS | Goldman Sachs Group Inc. | 212.07 | | BBY | Best Buy Co. | 48.47 |
| ORCL | Oracle Corp. | 17.25 | | | | |

Strike % from Stock Price

⊙ 0   ⊙ 50
↑
1310

Expiration Date

⊙ January ▾  2009 ▾
↑
1330

Premium Price

⊙ 100
↑
1320

[Back]   [Next]

PORTFOLIO: Option Portfolio 1

| Stock | Stock Price | | Option Symbol | Year/Strike | Bid | Ask |
|---|---|---|---|---|---|---|
| CSCO | 26.62 | ☐ | VYCAY | 2009-01 27.50 Call | 4.90 | 5.00 |
| CSCO | 26.62 | ✓ | VYCAF | 2009-01 30.00 Call | 3.80 | 3.90 |
| CSCO | 26.62 | ☐ | VYCAG | 2009-01 35.00 Call | 2.20 | 2.35 |
| AAPL | 90.29 | ☐ | VAAAT | 2009-01 100.00 Call | 18.60 | 18.80 |
| AAPL | 90.29 | ✓ | VAAAB | 2009-01 110.00 Call | 15.10 | 15.40 |
| AAPL | 90.29 | ☐ | VAAAC | 2009-01 115.00 Call | 13.60 | 13.80 |
| AAPL | 90.29 | ☐ | VAAAD | 2009-01 120.00 Call | 12.30 | 12.50 |
| AAPL | 90.29 | ☐ | VAAAU | 2009-01 130.00 Call | 10.00 | 10.20 |
| BA | 90.29 | ☐ | VBOAR | 2009-01 90.00 Call | 13.90 | 14.10 |
| BA | 90.29 | ✓ | VBOAT | 2009-01 100.00 Call | 9.60 | 9.80 |
| BA | 90.29 | ☐ | VBOAB | 2009-01 110.00 Call | 6.40 | 6.60 |
| XOM | 90.29 | ☐ | ODUAO | 2009-01 75.00 Call | 8.60 | 9.10 |
| XOM | 90.29 | ✓ | ODUAP | 2009-01 80.00 Call | 3.60 | 4.00 |

PORTFOLIO: Option Portfolio 1

Total Investment Amount: 150000

| Stock | Stock Price | Option Symbol | Year/Strike | Bid | Ask | Contracts | Dollar Value |
|---|---|---|---|---|---|---|---|
| CSCO | 26.620 | VYCAF | 2009-01 30.00 Call | 3.80 | 3.90 | 35 | $13,650.00 |
| AAPL | 90.290 | VAAAB | 2009-01 110.00 Call | 15.10 | 15.40 | 9 | $13,860.00 |
| BA | 88.200 | VBOAT | 2009-01 100.00 Call | 9.60 | 9.80 | 14 | $13,720.00 |
| XOM | 71.930 | ODUAP | 2009-01 80.00 Call | 6.60 | 7.00 | 19 | $13,300.00 |
| GG | 26.080 | VHRAF | 2009-01 30.00 Call | 18.60 | 19.20 | 7 | $13,440.00 |
| CAT | 59.660 | VKTAN | 2009-01 70.00 Call | 6.00 | 6.20 | 22 | $13,640.00 |
| MSFT | 31.009 | VMFAH | 2009-01 40.00 Call | 1.25 | 1.35 | 101 | $13,635.00 |
| C | 54.3718 | VRNAL | 2009-01 60.00 Call | 3.20 | 3.50 | 39 | $13,650.00 |
| GS | 212.07001 | ZGYAF | 2009-01 230.00 Call | 29.70 | 31.00 | 4 | $12,400.00 |
| BBY | 48.470 | VBYAL | 2009-01 60.00 Call | 5.70 | 6.00 | 23 | $13,800.00 |
| ORCL | 17.250 | VOCAD | 2009-01 20.00 Call | 2.05 | 2.15 | 63 | $13,545.00 |

Fig. 15

PORTFOLIO: Option Portfolio 1

Sector Breakdown

- Basic Materials (18%)
- Financial (18%)
- Services (9%)
- Technology (36%)
- Industrial Goods (18%)

Portfolio Value

| | |
|---|---|
| Portfolio Value | $148,640.00 |
| Portfolio Created | 2007-01-18 |
| Total Positions | 11 |
| Total Option Contracts | 336 |
| Strike % from Stock price | 0-50% |
| Option Portfolio Expiration date | 2009-01-00 |
| Premium Filter Price | $100.00 |
| Today's Value | $148,560.00 |
| Portfolio Value Gain/Loss | -4.18% to -0.05% |
| Stock Portfolio Return | 0.09% |

Update Portfolio

| | Portfolio | Company Name | Stock Price | Year/Strike | Option Symbol | Bid | Ask | Contracts |
|---|---|---|---|---|---|---|---|---|
| Existing | AAPL | Apple Computer Inc. | 90.29 | 2009-01 110.00 Call | VAAAB | 15.10 | 15.40 | 9 |
| Today's | AAPL | Apple Computer Inc. | 90.45 | 2009-01 110.00 Call | VAAAB | 15.20 | 15.40 | 9 |
| Existing | BA | The Boeing Company | 88.20 | 2009-01 100.00 Call | VBOAT | 9.60 | 9.80 | 14 |
| Today's | BA | The Boeing Company | 88.28 | 2009-01 100.00 Call | VBOAT | 9.60 | 9.90 | 14 |

1600

Tabs: Portfolio Selection | Stock Selection | Option Selection | Investment Calculation | Portfolio Value

Fig. 16

PLATFORM FOR CUSTOMIZING A DERIVATIVE PORTFOLIO TRADING STRATEGY

RELATED APPLICATIONS

This application claims the benefit of a U.S. Provisional Application for Patent Ser. No. 60/775,751, for a "Platform for Customizing a Derivative Portfolio Trading Strategy," filed on Feb. 22, 2006, and which is herein incorporated by reference.

FIELD OF THE INVENTION

This invention relates generally to a user interface to enable a firm's clients to implement a custom strategy for investing in a portfolio of long-term derivatives, and more particularly, for implementing customizable strategies for recovering the time premium of derivative financial contracts and exploiting persistent asymmetrical market return patterns.

BACKGROUND AND SUMMARY OF THE INVENTION

In finance, a derivative is financial instrument whose return is derived from the performance of an underlying asset or assets. The most common types of derivatives are futures, options, and swaps. Farmers, mortgage lenders, insurance companies, mineral producers, and other entities frequently use derivatives to offload risk. For example, a farmer might sell a futures contract promising to sell a future harvest to a purchaser at a fixed per-bushel price. In this manner, the farmer knows how much he will make per bushel long before that bushel is ever harvested, and protects himself from the risk that market prices for his agricultural product will plummet at harvest time. The purchaser protects itself from the risk that market prices for the agricultural product will spike at harvest time. As another example, a commercial airline might buy an options contract from a jet fuel distributor giving the commercial airline the right to buy a quantity of jet fuel at a future date at a fixed price. In this manner, the commercial airline protects itself from a temporary spike in the price of jet fuel.

Brief Primer on Options

For purposes of brevity, the remainder of this specification will focus on the invention's applicability to options, and especially, on call options. It should be understood, however, that the scope and principles of this invention are not necessarily limited to options or call options, unless and to the extent that the claims expressly limit them to such.

A call option is a financial contract that gives the buyer of the option the right, but not the obligation, to buy an agreed quantity of a particular asset (e.g., shares of stock) from the seller of the option at a certain time for a certain price, called the strike price. A trader who expects a stock price to increase can leverage his bet by buying call options on the stock rather than buying the underlying stock itself.

Conversely, a put option is a financial contract that gives the buyer of the put the right, but not the obligation, to sell an agreed quantity of a particular asset to the seller of the option at a certain time for a certain price (the strike price). A trader who expects a stock's price to decrease can make a bet by buying put options on the stock. The trader's risk is limited to the cost of the put option. By comparison, if the trader chose instead to short-sell the underlying stock, the trader's risk would be potentially unlimited.

How Options are Valued

The market price of a call option reflects the market's assessment of the likelihood that the option will finish "in the money," that is, that the price of the underlying asset will rise sufficiently to match or exceed the strike price of the call option before or by the time the call option expires. Conceptually, there are two main theoretical components to the price of a call option—the call option's time value and the call option's intrinsic value.

The time value of a call option depends on two factors. The first factor is the volatility of the underlying asset. The more volatile the underlying asset, the more likely that it is to meet or exceed the strike price on the expiration date. Therefore, the more volatile the asset, the greater its time value. The second factor is the time to expiration. The farther away the expiration date is, the more likely that the underlying asset will reach or exceed the call option strike price. Therefore, the time value of an option declines exponentially with time, reaching zero at the expiration date.

The intrinsic value of a call option is the difference between the strike price of the option to the current market value of the underlying asset, also known as the spot price. A call option whose strike price exceeds the spot price is referred to as an out-of-the-money option. An option that expires out-of-the-money expires worthless. The time value of a call option is the difference between the market value of the option and the intrinsic value of the option.

In 1973, two economists developed a complex mathematical formula, known as the Black-Scholes model, for calculating a "theoretically" appropriate price for an equity option. The Black-Scholes equation assumes that the probable future price of an underlying security will follow a normal distribution. Furthermore, the Black Scholes equation assumes that the price of the stock will follow a geometric Brownian motion with constant drift and volatility. The equation also assumes that the price of an option will be a function, in part, of the opportunity cost of investing money into the option. The opportunity cost is the interest that the investor would otherwise earn on the investment had it been invested in a risk-free manner. This opportunity cost is typically modeled as a function of the time to expiration of the option and the prevailing "risk-free" interest rate.

The Black-Scholes model, which is sometimes referred to as the "Fundamental Theorem of Finance," laid the foundation for the modern, and rapidly growing, derivatives market. The model gave "market makers" a theoretical basis for pricing options and assessing the risk, and potential profits to be earned (based on the bid-ask spread), entailed in creating, buying, and selling options to the public through an exchange.

The Black-Scholes model, however, does not perfectly model the historical patterns of equities prices. For example, U.S. stock prices over much of the $20^{th}$ century have, on average, appreciated far more rapidly between the months of November and April than between the months of May and October. One would not expect such a persistent asymmetric pattern to emerge from a market whose stock behavior modeled a geometric Brownian motion with constant drift and volatility.

Some experts have surmised that the reason that asymmetrical market return patterns have persisted so long is the difficulty of successfully arbitraging them, given the transaction costs and tax consequences often associated with any arbitrage attempt. If a typical investor annually bought a basket of equities on November 1, and then annually sold that basket on May 1, investing the proceeds in risk-free assets in the months of May through October, that investor would incur the transaction costs associated with buying and selling that basket twice a year, and also annually incur tax liabilities on any realized gains. The transaction costs and tax liabilities are likely to exceed the benefits of following this strategy.

Using Options to Arbitrage Persistent Asymmetrical Market Behaviors

It is one of the objects of this invention to give an investor a derivative-trading strategy for more effectively attempting to leverage persistent asymmetrical market return patterns, such as the one described above. The time value of an option investment is such a large fraction of its overall cost, especially in the case of deep-out-of-the-money options, that an investor can more efficiently attempt to leverage these asymmetrical market patterns by trading in and out of derivatives than by trading in and out of the underlying securities. For example, if an asymmetrical pattern of equity appreciation persists in a market that prices options approximately according to their theoretical, Black-Scholes model, then the investor can arbitrage this pattern by selling call options short at the beginning of a season of historically depressed returns, and closing out the position at or near the end of that season. Likewise, the investor can further arbitrage this pattern by purchasing call options, or selling put options, at the beginning of a season of historically enhanced market performance, and closing out that position at or near the end of that season.

Using Baskets of Options to Diversify Risk

Although an investor could attempt to leverage an asymmetrical market pattern by trading derivatives on a single company's stock, the investor would, by doing so, expose himself to all of the risks associated with that one stock. Therefore, it is another object of this invention to provide customizable strategies for assembling a portfolio of derivatives, such as call options, to more effectively arbitrage the asymmetrical stock performance characteristics of the whole market, or of one or more specific segments (e.g., large, small, growth, or value) or industry sectors within the market, without becoming over-exposed to the peculiar risks associated with any given company.

Long Term Options

In 1990 the Chicago Board Options Exchange introduced long term call options which they referred to as "Long Term Equity Anticipation Securities" or LEAPS® in response to market interest in options with longer term expirations. The Chicago Board's LEAPS have expiration dates up to three years from the date they are issued. They are typically issued with strike prices approximately 25% above or below the price of the underlying stock when the lead was first offered. It is therefore another object of this invention to enable investors to customize strategies for assembling a portfolio of long term options, and especially long term call options.

Trading Platform for Individual Clients

Although the market for derivatives has exploded in recent years, the pool of participants in the derivatives market is still mostly confined to large institutions such as hedge funds, insurance companies, commodities businesses, and banks and other financial institutions. Most discount brokerages do not permit their investors to participate in the option trading market. Furthermore, individual investor interest in derivatives has been largely confined to speculation in individual options.

Therefore, it is yet another object of this invention to provide a trading platform for individual investors that provides customized filters for selecting a portfolio of options using the derivative trading strategies of the present invention.

These and many other embodiments and advantages of the invention will be readily apparent to those skilled in the art from the following detailed description taken in conjunction with the annexed sheets of drawings, which illustrate the invention.

BRIEF DESCRIPTION OF THE DRAWINGS

FIG. 5 is a view of a spreadsheet illustrating the execution of one embodiment of the time completion premium recovery method of the present invention.

FIG. 12 illustrates a second stock selection screen for one embodiment of a client-based user interface for an Internet-based server-client options trading strategy platform.

FIG. 13 illustrates an option filter selection screen for one embodiment of a client-based user interface for an Internet-based server-client options trading strategy platform.

FIG. 14 illustrates a individual option selection screen for one embodiment of a client-based user interface for an Internet-based server-client options trading strategy platform.

FIG. 15 illustrates an investment calculation screen for one embodiment of a client-based user interface for an Internet-based server-client options trading strategy platform.

FIG. 16 illustrates a portfolio value screen for one embodiment of a client-based user interface for an Internet-based server-client options trading strategy platform.

DETAILED DESCRIPTION

Figure 1:
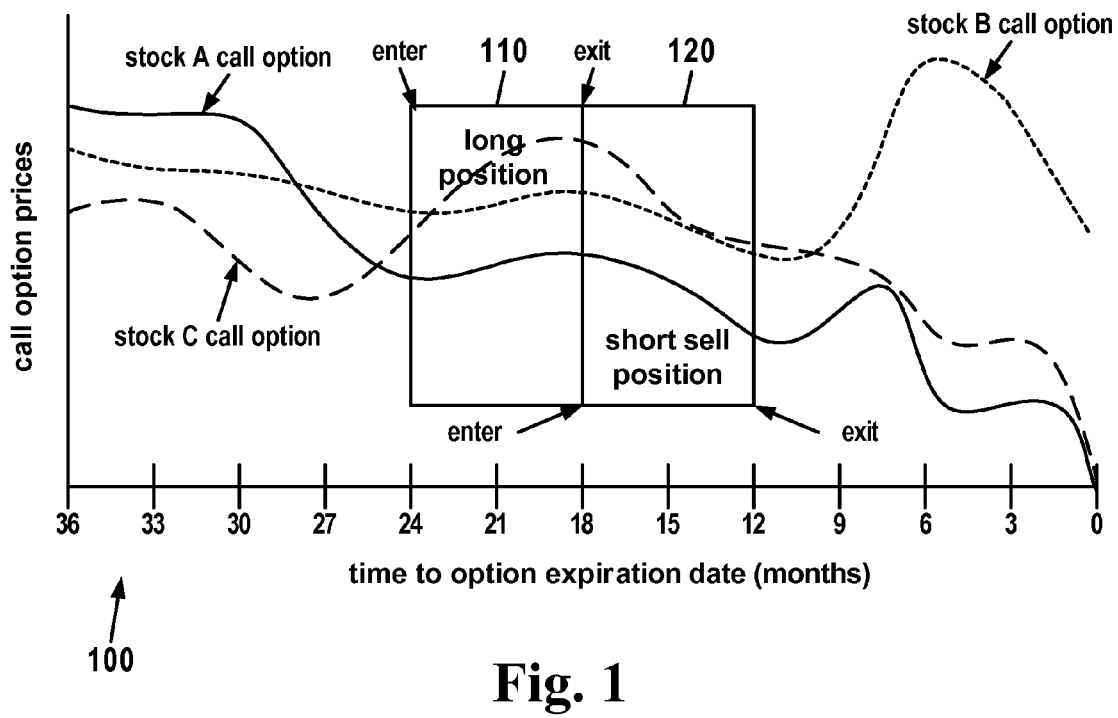
FIG. 1 is a graph illustrating the predominantly downward-trending value of long term call options, reflecting depletion of the time value of the options.

Before the subject invention is described further, it is to be understood that the invention is not limited to the particular embodiments of the invention described below or depicted in the drawings. Many modifications may be made to adapt a particular situation, composition, process, process step or steps, to the objective, spirit and scope of the present invention. Therefore, it should be understood that, unless otherwise specified, this invention is not to be limited to the specific details shown and described herein, and all such modifications are intended to be within the scope of the claims made herein.

It is also to be understood that the terminology employed in the Summary of the Invention and Detailed Description sections of this application is for the purpose of describing particular embodiments. Unless the context clearly demonstrates otherwise, it is not intended to be limiting. In this specification and the appended claims, the singular forms "a," "an" and "the" include plural references unless the context clearly dictates otherwise. Conversely, it is contemplated that the claims may be drafted to exclude any optional element or be further limited using exclusive terminology as "solely," "only" and the like in connection with the recitation of claim elements or by use of a "negative" limitation. It is also contemplated that any optional feature of the inventive variations described herein may be set forth and claimed independently, or in combination with any one or more of the features described herein.

As used in this application, the terms "computer" and "software" are used in their conventional senses. A computer has a processor, computer memory (such as volatile random-access memory, flash memory, hard drives, floppy drives, compact disk drives, optical drives), one or more input devices (such as computer mice, keyboards, remote control devices, scanners, communication ports, and/or touch screens), and one or more output devices (such as computer monitors, speakers, printers, communication ports, and/or other peripherals). Computers encompass servers, workstations, desktops, laptops, personal digital assistants, processor- and memory-based cell phones, and, increasingly, home entertainment devices such as television sets. Software comprises programs, routines, and symbolic languages stored in the computer's memory to control the functioning of the computer's hardware and direct its operation. A computer software program, module, or application is, in a sense, a configuration of the computer hardware that enables it to perform a function or application. It will be understood that the software programs, modules, and applications described herein covers both fully integrated self-contained lists of instructions, and combinations or packages of multiple independent applications.

FIG. 1 depicts a graph 100 illustrating the downward-trending value of long-term call options. The prices of call options on 3 exemplary stocks A, B, C, are graphed against the number of months to the expiration date of the options. The call options for Stocks A and C are depicted as trending down eventually to zero by the expiration date. The price for the call option for Stock B depicted in a small dashed line is shown expiring with a positive value, which would indicate that the size of the stock rose sufficiently during the option period for the option to finish in the money. Block 110 within the graph 100 illustrates an exemplary time frame representing historically outperforming seasons of equity returns within which to execute and then exit a long position on a diverse basket of these deep, out-of-the-money long-term call options. Block 120 within the graph 100 illustrates an exemplary time frame representing historically underperforming seasons of equity returns within which to execute and then exit a short sell position on a diverse basket of these deep, out-of-the-money long-term call options.

Figure 2:
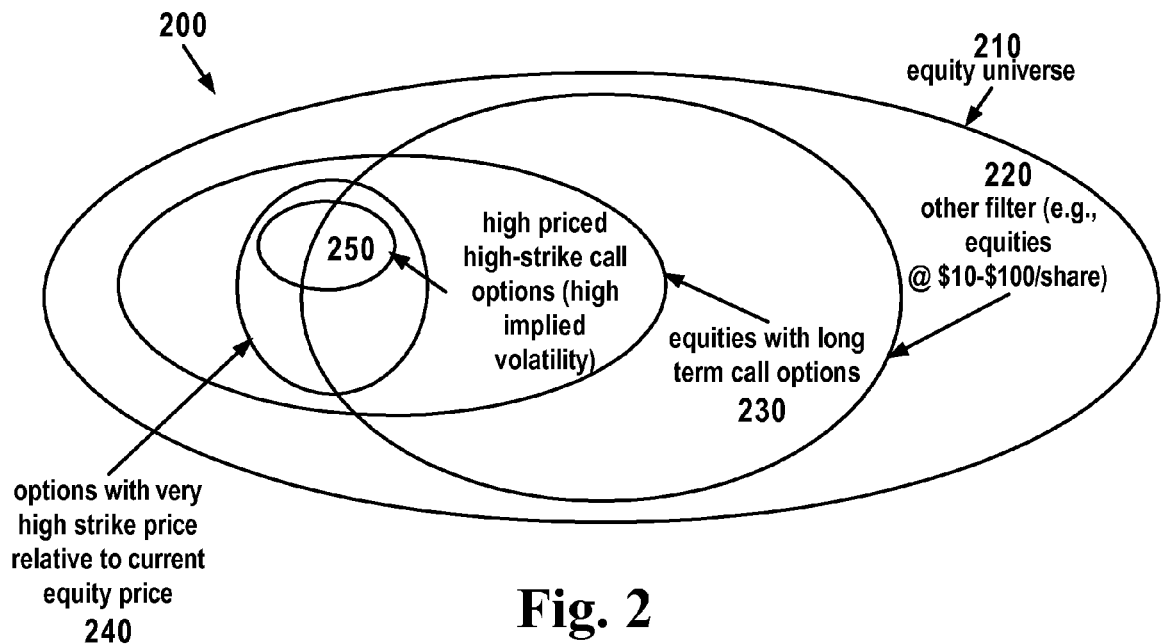
FIG. 2 is an illustration of one embodiment of a set of selection criteria used to identify a diverse selection of long term call options to which the time premium recovery strategy of the present invention may be applied.

FIG. 2 illustrates one embodiment of a set of selection criteria used to identify a diverse basket of these deep, out-of-the-money, long-term call options. The outer circle 210 represents the universe of available, tradeable equities. Within this equity universe 210 there is a subset 230 of equities for which long-term call options are available. Within this subset 230 is an even smaller subset 240 of long-term call options with very high strike prices relative to the current equity price. Within this deep, out-of-the-money subset 240 is an even smaller subset 250 of highly priced yet deep out-of-the-money call options. Yet other filters may be applied to further refine the basket of long term call options to which one may apply the time premium recovery strategy of the present invention. For example, subset 220 illustrates equities that are trading between 10 dollars and 100 dollars per share.

Figure 3:
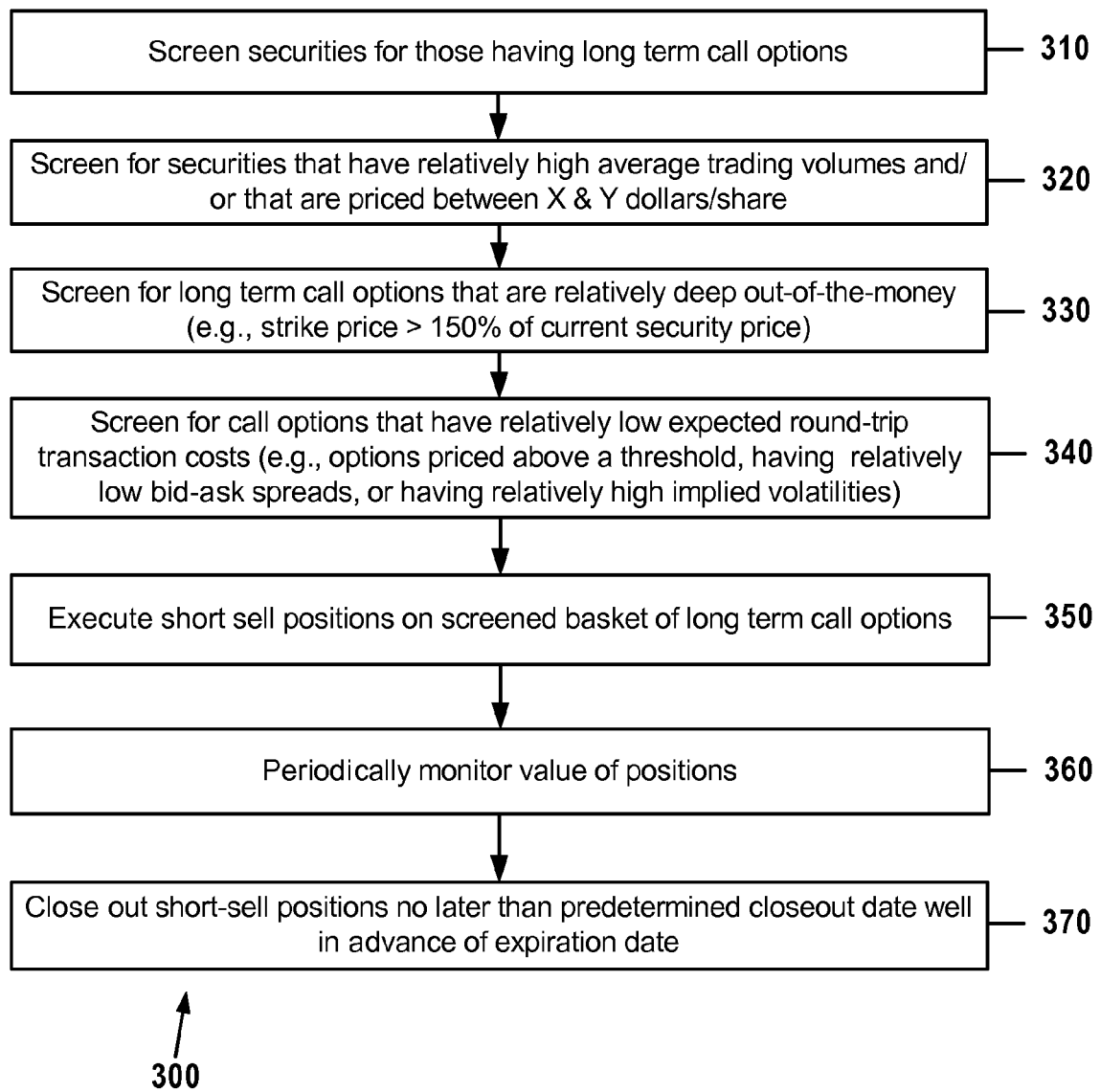
FIG. 3 is a flow chart illustrating a general customized embodiment of the time premium recovery method of the present invention.

FIG. 3 is a flowchart 300 illustrating a general customizable embodiment of the time premium recovery method of the present invention, involving short sales of long term call options. In functional block 310, a large set of equities with long-term call options is identified with a variable or fixed criteria for distinguishing a long term call option from a call option that is not long term. One suitable fixed criteria would be to treat any call option with an expiration date more then one year away as a long-term call option.

In functional block 320, the basket of equities or securities identified in block 310 are screened to include only those securities that have relatively high trading volumes and or that trade in a predefined dollar range per share. For example, the predefined dollar-range-per-share filter may include only securities that trade for between 10 and 100 dollars per share. In functional block 330, the basket of securities is further filtered or screened to include only those long-term call options that are relatively deep out-of-the-money. By way of illustration, a call option whose strike price is 50% above the current market value of the underlying security may be defined as being relatively deep-out-of-the-money.

In functional block 340, a set of tradable long-term call options is further screened to identify those options having relatively lower expected transaction costs. A variety of criteria may be used to accomplish this purpose. For example, these long-term call options could be screened to include only those options that are priced above a threshold, such as 50 cents for an option, or 50 dollars for 100-share call option contract. The call options could be screened to identify those options having relatively low bid-to-ask spreads, and relatively low bid-to-ask ratios. An alternative filtering criteria would identify call options with relatively high implied volatilities.

In functional block 350, short-sell positions are executed on this screened set of long term call options. Over the following months, the value of these positions are periodically revalued. In functional block 370, these short-sold positions are closed out no later then a preferably predetermined close out-date such as 6-8 months, that is, well in advance of the expiration date with dates of the options.

Figure 4:
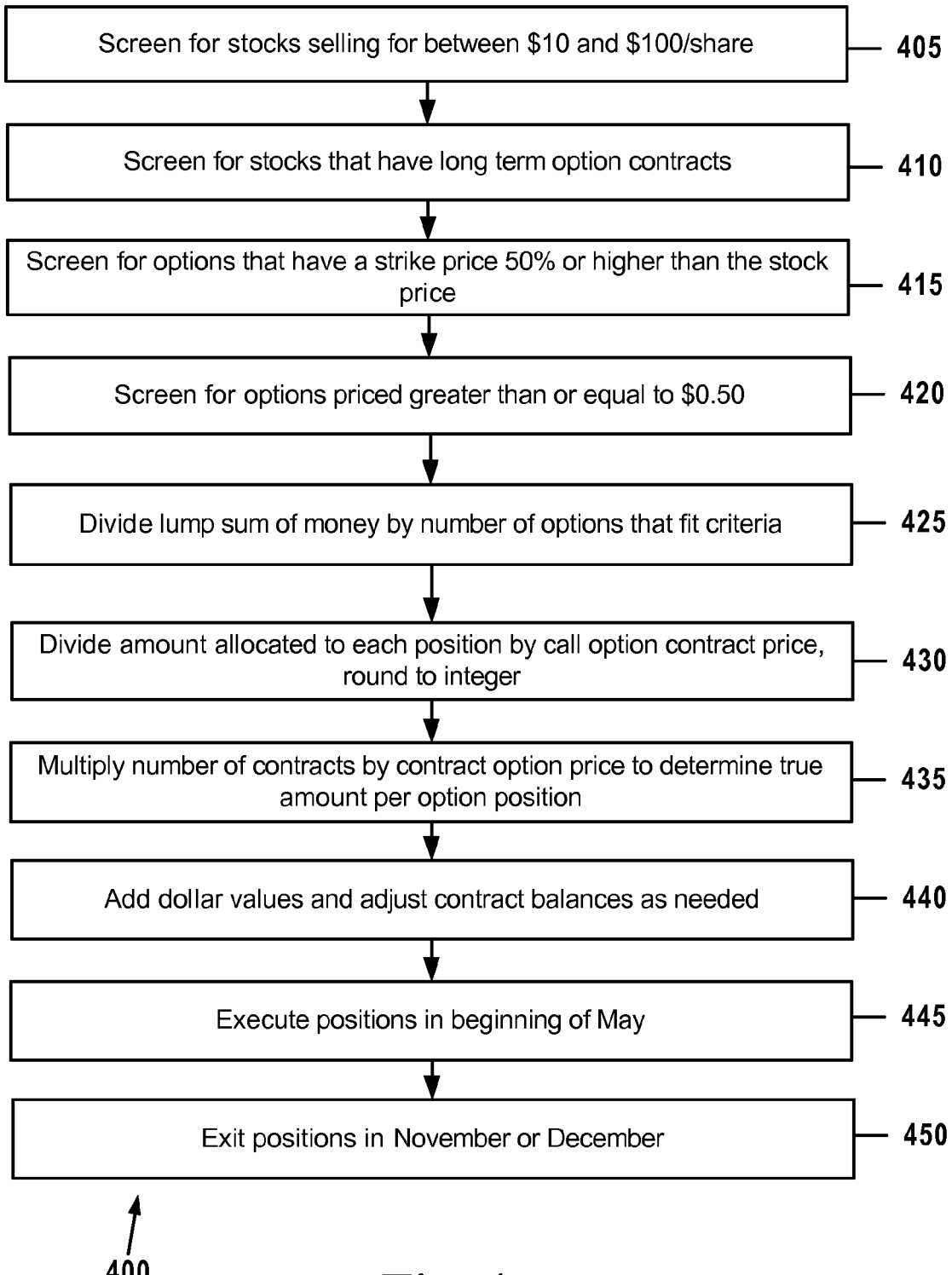
FIG. 4 is a flow chart illustrating one of many possible specific embodiments of the time premium recovery method of the present invention.

FIG. 4 is a flowchart 400 illustrating one of many possible specific embodiments of the time premium recovery method of the present invention. In step 405, one identifies stocks selling for between 10 dollars and 100 dollars per share. In step 410, one finds those stocks that have long-term option contracts. In step 415, one filters this basket of stocks and corresponding options for options that have a strike price of 50% or higher than the stock price. In step 420, one further filters this basket of stocks and corresponding options to identify those options that are priced greater than, or equal to, 50 cents per share or 50 dollars per option contract. In step 425, one divides a lump sum of money—for example, $100,000—by the number of stocks and corresponding call options that fit the criteria. That 430, one divides the amount allocated to each stock by the call option contract price and rounds that to an integer number. In step 435, one multiplies the number of contracts by the contract option price. In step 440, one adds the dollar values and adjusts the contract balances as needed. In step 445, one executes short-sell positions on each of these call options in the beginning of May. In step 450, one exits these positions in November or December.

FIG. 5 is a view of a spreadsheet 500 illustrating the execution of one embodiment of the time depletion premium recovery method of the present invention. Column 510 sets forth a list of securities having long term call options that meet the selection criteria of FIG. 4. Column 515 sets forth the stock prices of these securities as of May 1, 2004. Column 520 lists the strike prices of the January 2006 call options for these securities. For each of these 17 listed stocks, the strike price of the January 2006 call option was approximately 150% or more of the underlying security market price. Column 525 lists the May 1, 2004 market prices of these January 6 call options for each of the 17 listed securities. Column 530 sets forth a targeted amount of money to be allocated to each position. In this exemplary embodiment, a lump sum of $100,000 is equally distributed to each of these 17 targeted positions. Column 535 brings forth the number of contracts that one can purchase with the money set forth in Column 530 given the option prices set forth in Column 525. In Column 540, the target number of contracts from 535 is rounded to an integer. Column 545 sets forth the estimated commission that will be charged to execute the position assuming a commission of $10 dollars for the first contract and $2 for each subsequent contract purchase for any given security. Column 550 sets forth the amount to be allocated to each call option position after the targeted number of contracts has been rounded. Column 555 sets forth the stock prices of these seventeen underlying securities as of Dec. 29, 2004. Column 560 sets forth the corresponding option prices as of Dec. 29, 2004 for those January 6 call options defined in column 520. Column 565 sets forth the value of each of these option positions as of Dec. 29, 2004. Column 570 sets forth the profit per position one would have realized have they short-sold the amount set forth in column 555 on May 1, 2004 and closed out those positions on Dec. 29, 2004. As shown at the bottom of column 570, a total profit of approximately $35,000 would have been realized on the $100,000 short-sell positions executed on May 1, 2004.

Figure 6:
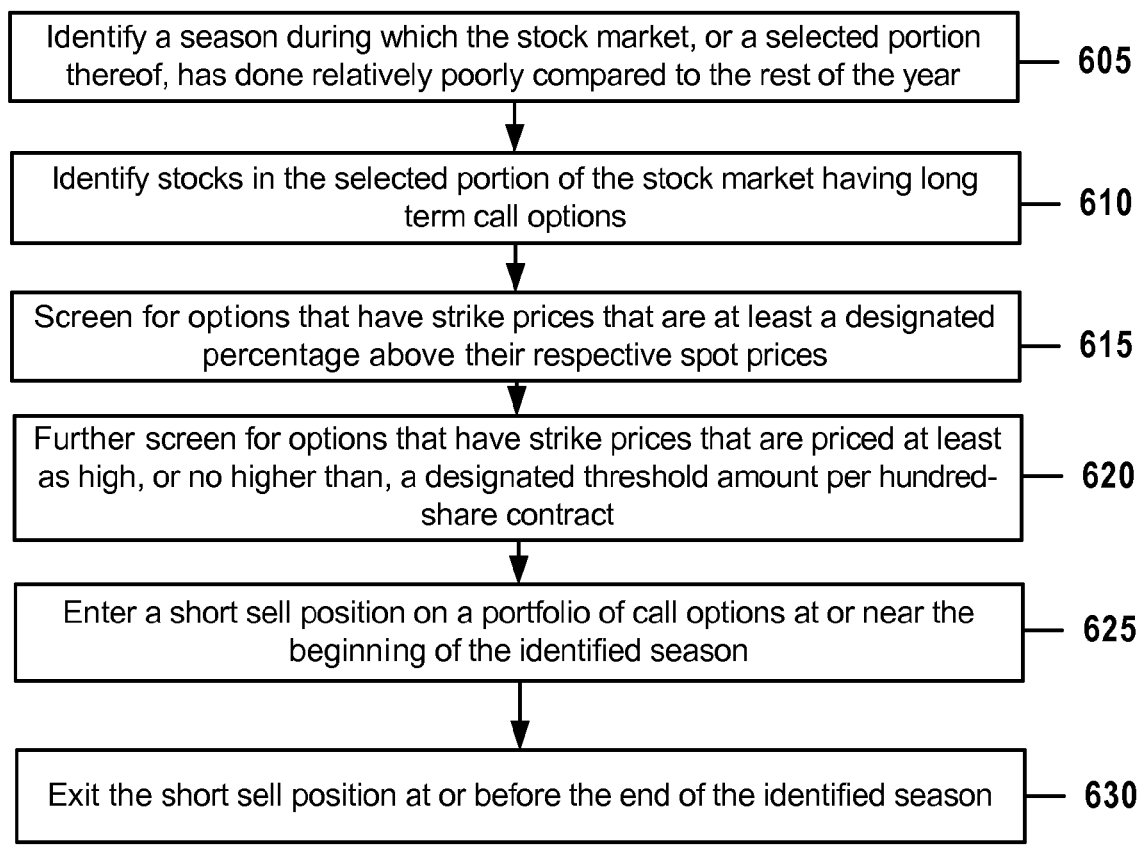
FIGS. 6 and 7 are flow charts illustrating general embodiments of methods for exploiting asymmetrical market return patterns.

FIG. 6 is a flow chart 600 illustrating an embodiment of a method for exploiting asymmetrical market return patterns. In step 605, identify a season (i.e., an annually-recurring time period) during which an equity market, or a selected portion thereof (such as or one or more size or style segments or industry sectors thereof) has, on average, delivered less return than the average annual return for the equity market or selected portion thereof, according to recent historical data extending over an unbroken period of at least twenty-five years, including at least one of the past six years. For example, such a period might include a portion of October and at least a portion of summer.

In step 610, identify a multitude (that is, a large, and preferably inclusive, group) of publicly-tradable long term call options corresponding to the stocks in the equity market, or selected portion thereof, to which the seasonal performance analysis of step 605 was applied. In step 615, screen the options identified in step 610 for options that have strike prices that are at least a designated percentage (for example, 50%) above their respective spot prices. In step 620, further screen the identified multitude of publicly-tradable long term call options for long term call options that are priced at least as high, or no higher than, a designated threshold amount per hundred-share contract. In step 625, enter a short sell position on a portfolio of call options at or near the beginning of the annually-recurring time period. In step 630, close out (i.e., exit) the short sell position at or before the end of the annually-recurring time period.

Figure 7:
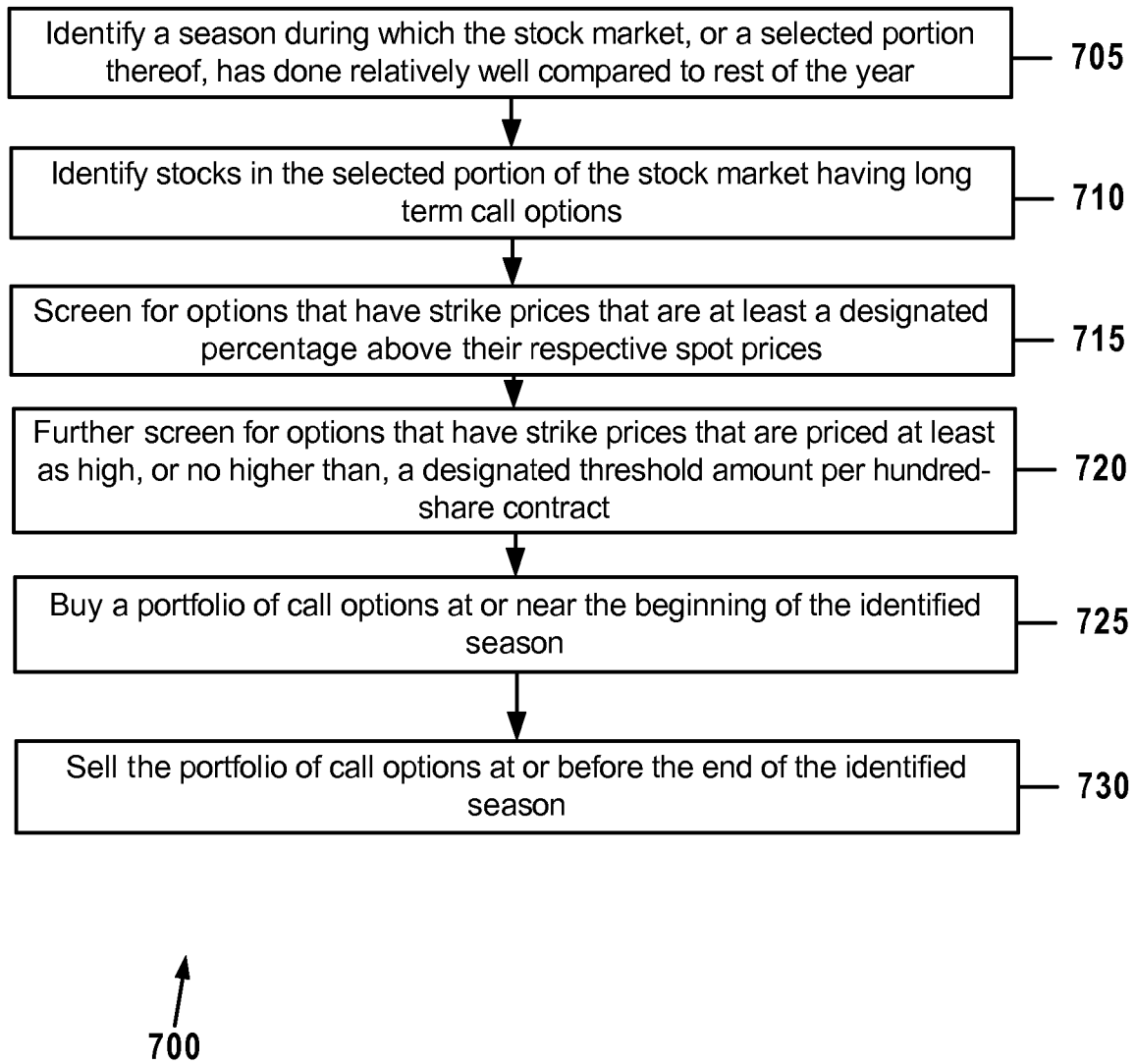

FIG. 7 is a flow chart 700 illustrating another embodiment of a method for exploiting asymmetrical market return patterns. In step 705, identify a season (i.e., an annually-recurring time period) during which an equity market, or a selected portion thereof (such as or one or more size or style segments or industry sectors thereof) has, on average, delivered greater return than the average annual return for the equity market or selected portion thereof, according to recent historical data extending over an unbroken period of at least twenty-five years, including at least one of the past six years. For example, such a period might include a portion of November, all of December, and at least a portion of the subsequent January.

In step 710, identify a multitude (that is, a large, and preferably inclusive, group) of publicly-tradable long term call options corresponding to the stocks in the equity market, or selected portion thereof, to which the seasonal performance analysis of step 705 was applied. In step 715, screen the options identified in step 710 for options that have strike prices that are at least a designated percentage (for example, 50%) above their respective spot prices. In step 720, further screen the identified multitude of publicly-tradable long term call options for long term call options that are priced at least as high, or no higher than, a designated threshold amount per hundred-share contract. In step 725, buy a portfolio of call options at or near the beginning of the annually-recurring time period. In step 730, sell the portfolio of call options at or before the end of the annually-recurring time period.

Preferably, the strategies of FIGS. 6 and 7 should be carried out on portfolio of call options on at least twenty different underlying securities. To extend the strategy throughout the year, an options trading strategy may incorporate both the short-selling strategy of FIG. 6 for historically underperforming seasons and the going-long strategy of FIG. 7 for historically outperforming seasons. In this manner, an options trading strategy would be structured to exploit both the long and short sides of the market.

To further reduce risk, an options trading strategy may also combine the short-selling strategy of FIG. 6 with a passive investments in a basket of the underlying equities, thereby at least partially covering the calls. For example, the money received from short selling the call options may be reinvested in the underlying equities.

Figure 8:
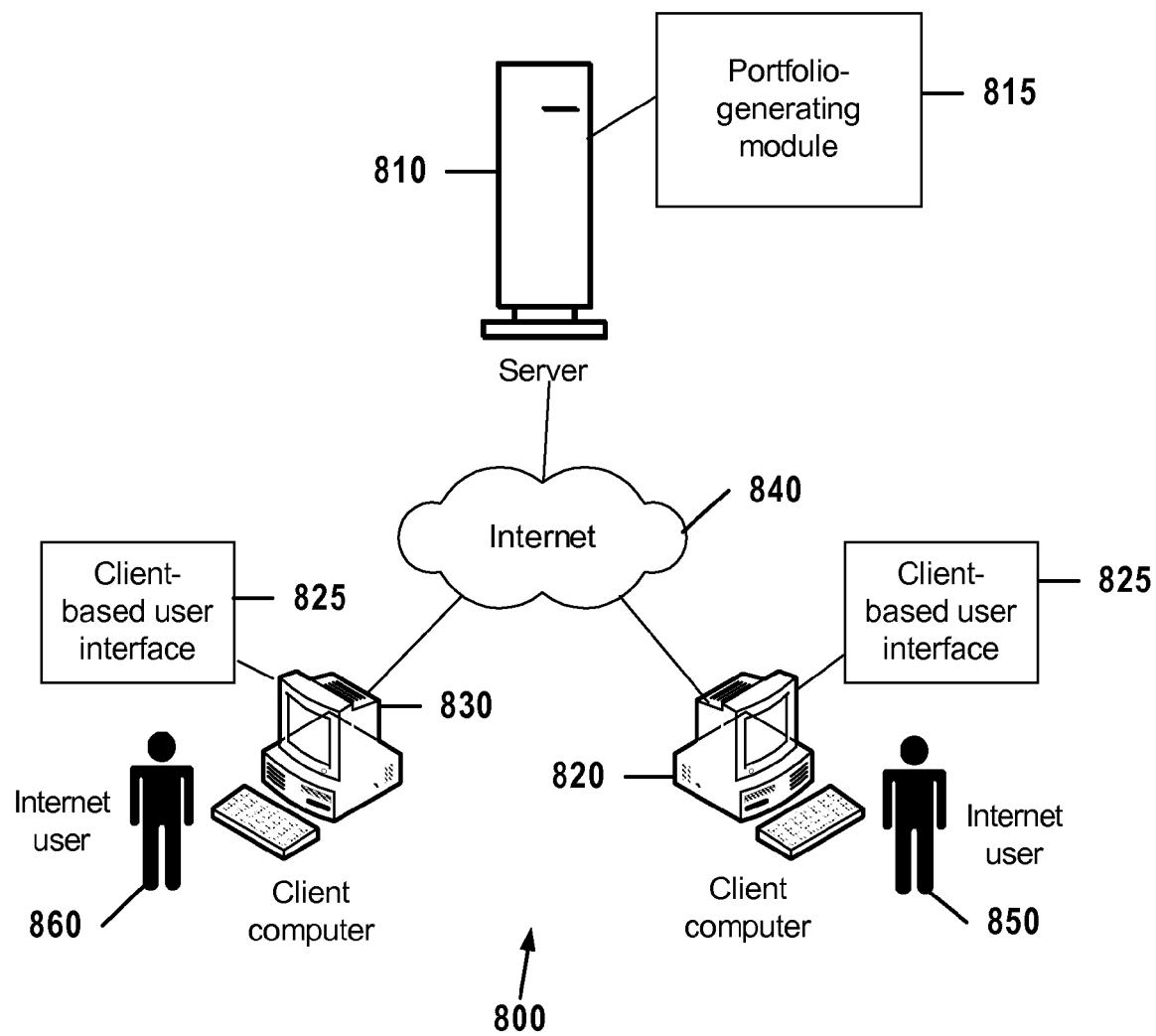
FIG. 8 is a block diagram illustrating one embodiment of an Internet-based server-client options trading strategy platform.

FIG. 8 is a block diagram illustrating one embodiment of an Internet-based server-client options trading strategy platform. A server 810 is provided for hosting a website that includes a portfolio-trading strategy platform accessible to users 850 and 860 of the Internet 840. When a user 850 or 860 accesses the website, the server 810 sends the user's client computer 820 or 830 a web page or script providing the user with a client-based user interface 825 for entering user-designated filtering criteria.

Figure 10:
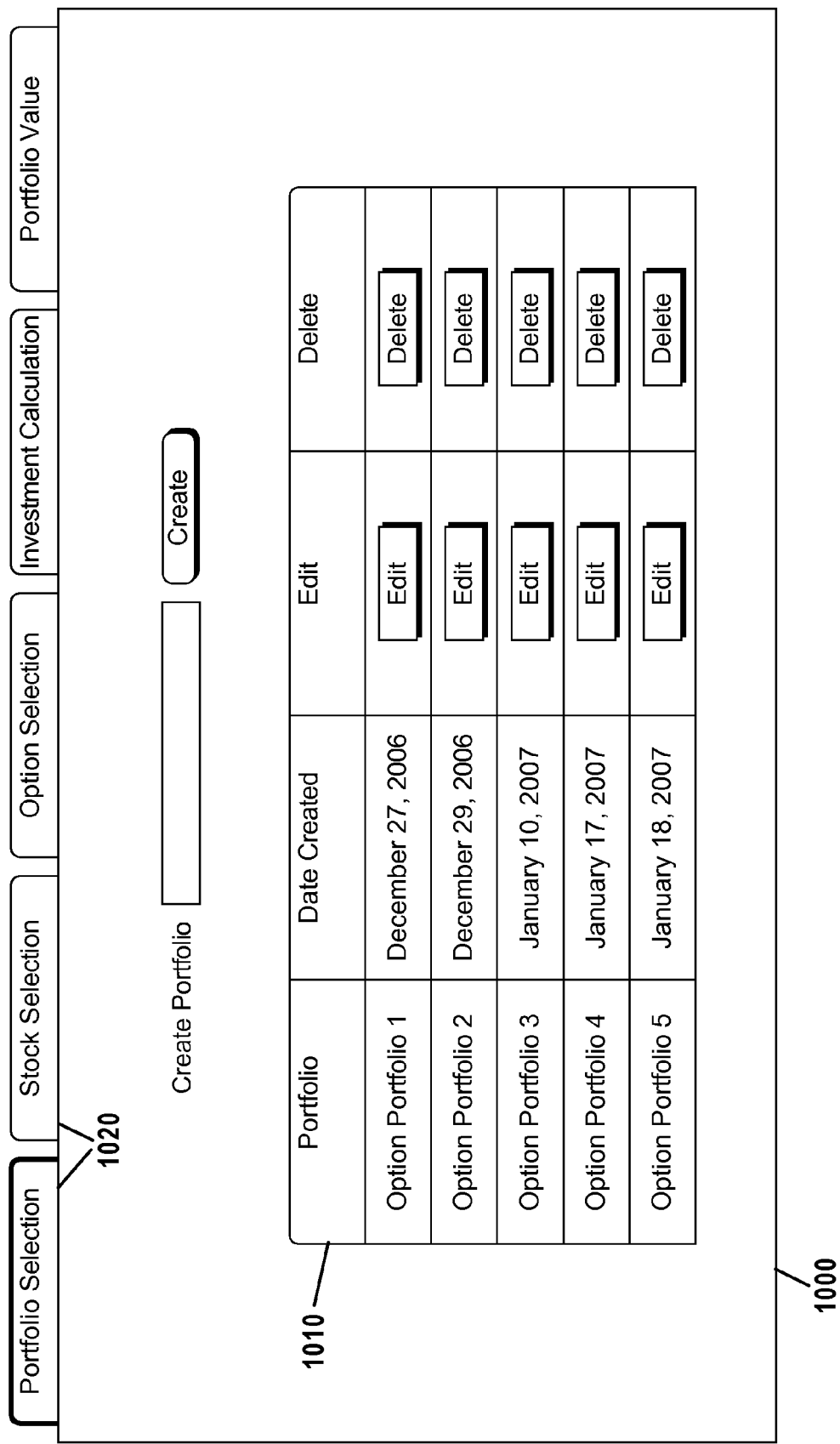
FIG. 10 illustrates a portfolio selection screen for one embodiment of a client-based user interface for an Internet-based server-client options trading strategy platform.
Figure 11:
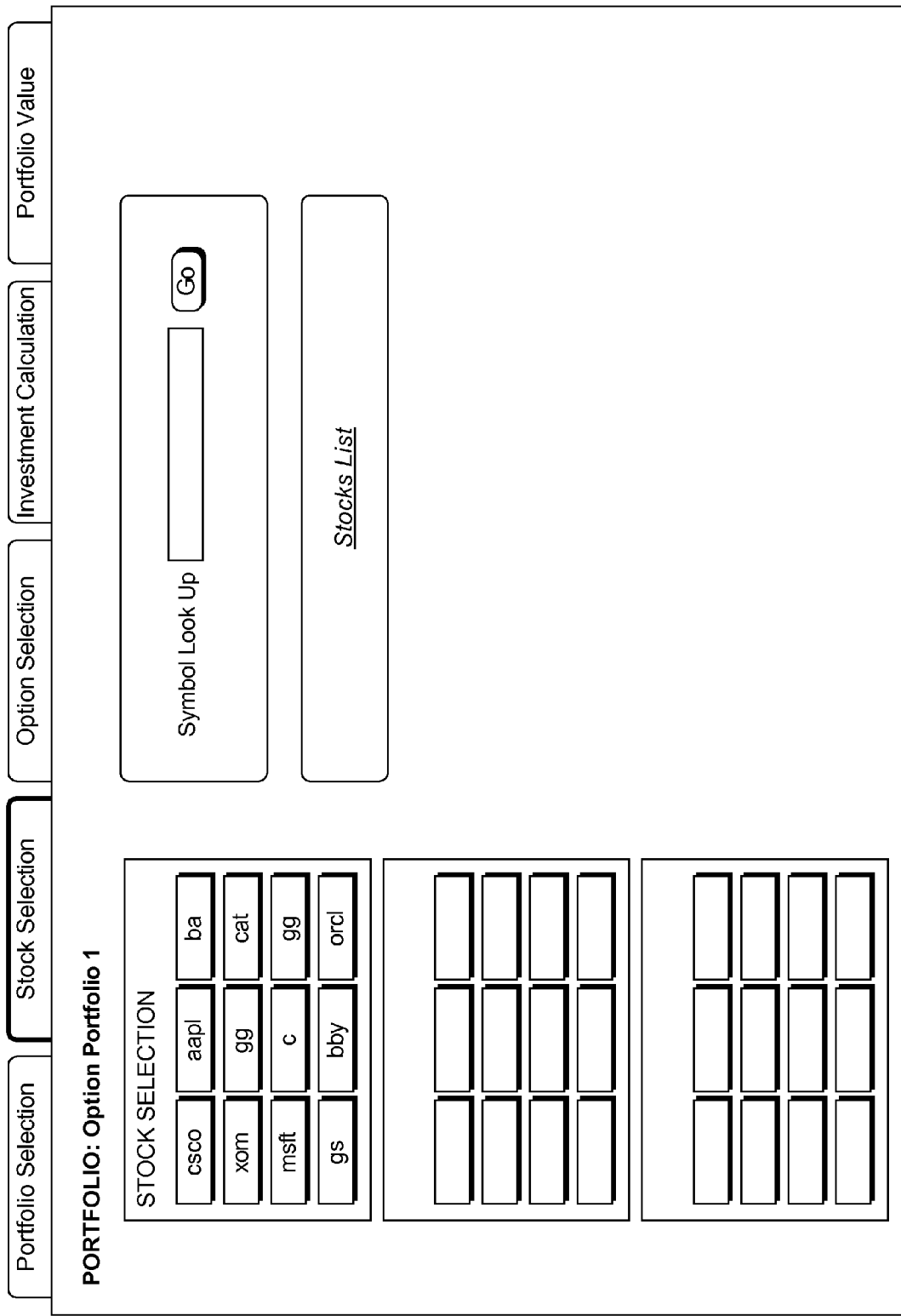
FIG. 11 illustrates a stock selection screen for one embodiment of a client-based user interface for an Internet-based server-client options trading strategy platform.

FIGS. 10-16 illustrate one embodiment of such a client-based user interface 825. As shown in FIG. 10, the user is presented with a portfolio selection screen 1000 that enables a user to create, edit, or delete option portfolios. A table 1010 lists portfolios that have previously been created by name and the date they were created. Selectable tabs 1020 at the top of the screen illustrate the user's progression through the stock and option selection and filtering processes. As shown in FIG. 11, the user is presented with a stock selection screen 1100 that enables the user to identify an initial basket of stocks that are candidates for the user's option trading portfolio. FIG. 12 presents a second stock selection screen 1200 that provides the user with a list 1210 of selected stocks, a section 1220 to illustrate relevant trading information for a particular stock, and a sector breakdown 1230 to inform the user how the basket of selected stocks are distributed across different sectors of the economy.

FIG. 13 illustrates an option selection screen 1300 that gives the user the ability to apply several pre-selected filters to that initial basket of options. One or more how-deep-out-of-the-money filter dialog boxes 1310 are provided for identifying options on underlying shares of various equities having strike prices that are at least a designated percentage above the respective spot prices of the underlying equity shares. One or more premium-price dialog boxes 1320 are provided for identifying options whose premiums are priced at least as high, or no higher than, a designated threshold amount, and a time-to-expiration filter for identifying options. One or more time-to-expiration dialog boxes 1330 are provided for identifying options with expiration dates at least a designated minimum length of time away. Although not depicted in FIG. 13, other filters may also be provided. For example, an underlying-share-price filter may be provided for identifying options whose underlying shares are priced at least as high, or no higher than, a designated threshold amount.

The user's designated filtering criteria are communicated back to the server 810, where the server-based portfolio-generating module 815 generates the filtered portfolio of options by applying the how-deep-out-of-the-money and premium-price filters, together with the user-designated filtering criteria, for the previously identified group of stocks. The filtered portfolio of options is then communicated back to the client-based user interface 825, which presents the user with a second option selection screen 1400, as shown in FIG. 14, that lists the filtered portfolio options. The second option selection screen 1400 also enables the user to selectively mark options in the list 1410 that are to be included in the filtered portfolio.

In FIG. 15, an investment calculation screen 1500 enables the user to enter the amount of money to invest in the filtered portfolio in box 1510. When the user hits the calculate button 1520, the system approximately equally distributes the total investment amount between each of the selected options, and rounds the number of contracts for each selection option to an integer quantity. In this manner, the investment calculation screen 1500 presents a list of suggested amounts to invest into each of the options of the filtered portfolio. The investment calculation screen 1500 may also permit the user to individually adjust the number of contracts for each selected option. FIG. 16 illustrates a portfolio value screen 1600 that provides the user with a review of the value, sector breakdown characteristics, and to-date performance of the selected portfolio. Although not shown in FIGS. 10-17, the client-based user interface may be further adapted to accept user orders to purchase and/or short sell the filtered portfolio of options.

Figure 9:
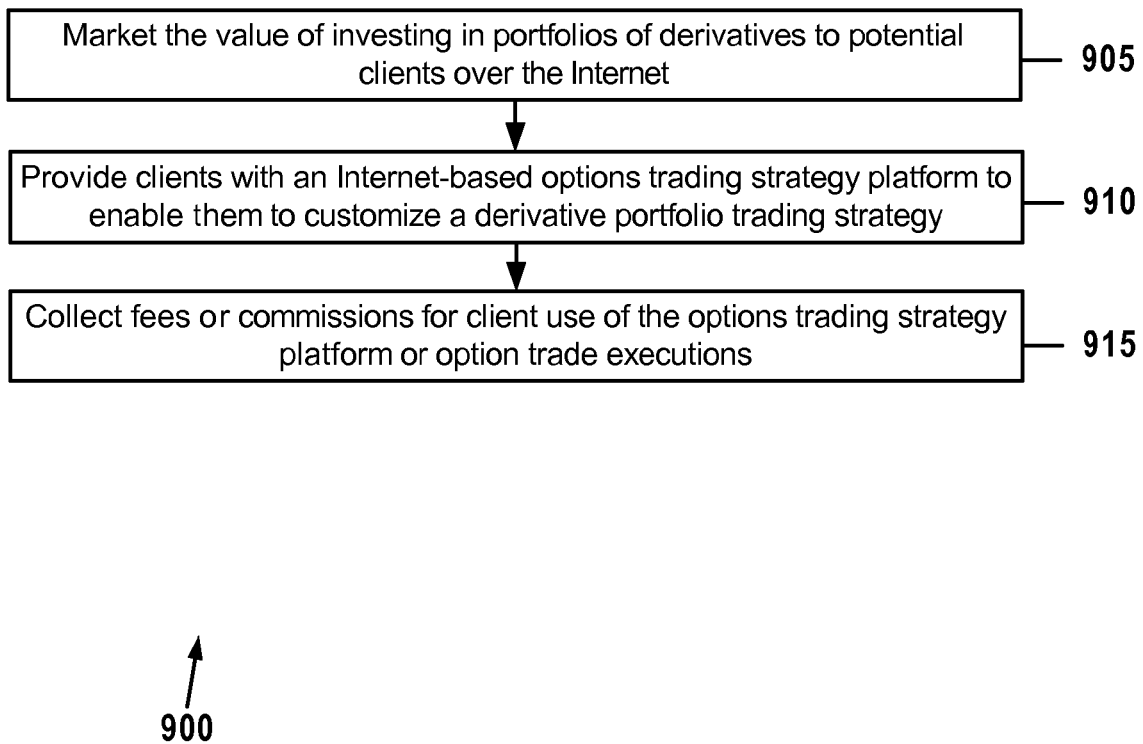
FIG. 9 is a flow chart illustrating a method of generating commissions or subscription fees using the principles of the present invention.

FIG. 9 is a flow chart illustrating a method of generating commissions or subscription fees using the principles of the present invention. In step 905, market the value of investing in portfolios of derivatives to potential clients over the Internet. More preferably, market a method for exploiting asymmetrical market return patterns by identifying an annually-recurring time period during which an equity market, or one or more size or style segments or industry sectors thereof, has, on average, delivered less return than the average annual return. Also, suggest that potential subscribers enter a short sell position on a portfolio of call options at or near the beginning of the annually-recurring time period and close out the short sell position at or before the end of the annually-recurring time period. In step 910, provide such clients with an Internet, server-client based options trading strategy platform to enable them to customize, test, and/or implement the suggested derivative portfolio trading strategy. In step 915, collect fees from the client to use the options trading strategy platform, collect commissions on client trading orders to implement the options trading strategy, or collect referral fees from third party options brokers that the clients use to implement their options trading strategies.

Although the foregoing specific details describe various embodiments of the invention, persons reasonably skilled in the art will recognize that various changes may be made in the details of the apparatus of this invention without departing from the spirit and scope of the invention as defined in the appended claims. Therefore, it should be understood that, unless otherwise specified, this invention is not to be limited to the specific details shown and described herein.

I claim:

1. A server-client based options portfolio trading strategy platform available to internet users for facilitating the generation of a filtered portfolio of options in which a user may invest, based on user-designated filtering criteria, said platform comprising:
    a server configured to generate a filtered portfolio of options;
    at least one non-transitory computer readable medium;
    a how-deep-out-of-the-money filter configured to identify options on underlying shares of various equities, said options having strike prices that are at least a designated percentage above respective spot prices of the underlying equity shares;
    an option portfolio price filter configured to identify options that are priced at least as high, or no higher than, a designated threshold amount;
    a client-based user interface configured to accept a user-designated percentage for use by the how-deep-out-of-the-money filter and a user-designated threshold amount for use by the option portfolio price filter;
    the client-based user interface being also configured to communicate the user-designated percentage and user-designated threshold amount to a server-based portfolio module;
    the server-based portfolio-generating module being configured to generate the filtered portfolio of options by applying the how-deep-out-of-the-money and option portfolio price filters, together with the user-designated filtering criteria, on a larger, previously identified group of options;
    the client-based user interface being configured to present a list of the filtered portfolio of options to the user
    an underlying-share-price filter configured to identify options whose underlying shares are priced at least as high, or no higher than, a designated threshold amount; wherein the client -based user interface being configured to accept a user-designated threshold amount for use by the underlying-share-price filter; and the server-based portfolio-generating module being configured to generate the filtered portfolio of options by also applying the underlying-share-price filter on the larger previously identified group of options.

2. The server-client based options portfolio trading strategy platform of claim 1, wherein said portfolio of options is limited to call options.

3. The server-client based options portfolio trading strategy platform of claim 1, wherein said portfolio of derivatives includes long term call options having expiration dates that are at least twelve months away.

4. The server-client based options portfolio trading strategy platform of claim 3, further comprising:
    a time-to-expiration filter configured to identify options with expiration dates at least a designated minimum length of time away;

the client-based user interface being configured to accept a user-designated minimum time to expiration for use by the time-to-expiration filter, and to communicate the user -designated minimum time to expiration to the server-based portfolio-generating module;

the server-based portfolio-generating module being configured to generate the filtered portfolio of options by also applying the time-to-expiration filter on the larger, previously identified group of options.

5. The server-client based options portfolio trading strategy platform of claim 3, wherein the client-based user interface not only presents a list of the filtered portfolio of options to the user, but also enables the user to selectively mark options in that list that are to be deleted from the filtered portfolio.

6. The server-based options portfolio trading strategy platform of claim 5, wherein the client-based user interface is further configured to accept a user-specified number representing the amount of money that is to be invested in the filtered portfolio.

7. The server-based options portfolio trading strategy platform of claim 6, wherein the client-based user interface is further configured to present a list of suggested amounts to allocate into each of the options of the filtered portfolio.

8. The server-based options portfolio trading strategy platform of claim 7, wherein the client-based user interface is further configured to accept a user order to purchase said filtered portfolio of options.

9. The server-based options portfolio trading strategy platform of claim 7, wherein the client-based user interface is further configured to accept a user order to short sell said filtered portfolio of options.

* * * * *